United States Patent [19]

Buckland

[11] Patent Number: 5,043,037
[45] Date of Patent: Aug. 27, 1991

[54] METHOD FOR MAKING HIGH STRAIN AERIAL FIBER OPTIC CABLE

[75] Inventor: Eric L. Buckland, Raleigh, N.C.

[73] Assignee: Sumitomo Electric Fiber Optics Corporation, Research Triangle Park, N.C.

[21] Appl. No.: 440,984

[22] Filed: Nov. 22, 1989

[51] Int. Cl.$^5$ ............................ G02B 6/44; H02G 7/05
[52] U.S. Cl. .................................... 156/166; 156/158; 174/70 A; 385/113; 385/109
[58] Field of Search ............................ 156/158, 166; 350/96.23; 174/70 A

[56] References Cited

U.S. PATENT DOCUMENTS

| | | | |
|---|---|---|---|
| 3,297,814 | 1/1967 | McClean et al. | 174/70 A |
| 3,532,783 | 10/1970 | Pusey et al. | 174/70 A |
| 4,438,293 | 3/1984 | Voser | 174/70 A X |
| 4,650,715 | 3/1987 | Voser | 174/70 A X |
| 4,763,983 | 8/1988 | Keith | 350/96.23 |
| 4,776,664 | 10/1988 | Okura | 174/70 A X |

FOREIGN PATENT DOCUMENTS

| | | | |
|---|---|---|---|
| 1024228 | 1/1978 | Canada | 174/70 A |
| 0328409 | 8/1989 | European Pat. Off. | 350/96.23 |
| 2525067 | 12/1975 | Fed. Rep. of Germany | 350/96.23 |
| 3037289 | 4/1982 | Fed. Rep. of Germany | 350/96.23 |
| 3315473 | 10/1984 | Fed. Rep. of Germany | 350/96.23 |
| 56-83704 | 7/1981 | Japan | 350/96.23 |
| 59-50404 | 3/1984 | Japan | 350/96.23 |
| 61-7816 | 1/1986 | Japan | 350/96.23 |
| 2215080 | 9/1989 | United Kingdom | 350/96.23 |

OTHER PUBLICATIONS

Maddock, B. J. et al., Proceeding of the 29th Int'l Wire and Cable Symposium, Conference; Cherry Hill, N.J., U.S.A. (18–20, Nov. 1980) entitled "Optical Fibers in Overhead Power Transmission Systems for Comm. & Control".
Tomita, S. et al., "Suppression of Galloping Oscillation for a Self-Supporting Optical Fiber Cable", *Journal of Lightguide Technology*, vol. 6, No. 2, Feb. 1988, pp. 186–190.
Rahman, M. M. et al., "Design and Practical Considerations for Manufacturing a Non-Metallic Fiber Optic Cable for Aerial Appl.", Proceedings of the 29th Int'l Wire & Cable Symposium, Conference, Cherry Hill, N.J., U.S.A. (18–20, Nov. 1980).
Oestreich, U. et al., "Fiber Optic Cable for Aerial Appl.", Proceedings of the 29th Int'l Wire & Cable Symposium, Conference: Cherry Hill, N.J., U.S.A. (18–20 Nov. 1980).
Ishihata et al., "Improvement of Fiber Reliability in Splice Enclosures Resulting from the Reduction of Relative Movement Between Cable Core and Sheath" in *International Wire & Cable Symposium Proceedings 1984*, pp. 82–91.

Primary Examiner—Michael W. Ball
Assistant Examiner—Jeff H. Aftergut
Attorney, Agent, or Firm—Richard E. Jenkins

[57] ABSTRACT

A method for making an improved all-dielectric, self-supporting (ADSS) fiber optic aerial cable with improved mechanical coupling between the primary and secondary strength elements. The method includes calculating the required degree of mechanical coupling (Kc) between the primary and secondary strength elements in order to avoid relative slippage therebetween and then selecting suitable cable elements so as to make the fiber optic cable with a degree of mechanical coupling at least equal to the calculated Kc value.

20 Claims, 2 Drawing Sheets

METHOD FOR MAKING HIGH STRAIN AERIAL FIBER OPTIC CABLE

TECHNICAL FIELD

The present invention relates to a method for making an improved all-dielectric, self-supporting (ADSS) fiber optic cable and, more particularly, it relates to a method for making an all-dielectric, self-supporting fiber optic cable for aerial applications which allows for higher operational cable string levels due to improved mechanical coupling between the primary and secondary strength elements of the aerial fiber optic cable.

DESCRIPTION OF THE PRIOR ART

The subject of all-dielectric, self-supporting fiber optic cables is of growing interest in the communications and utilities industries. Particularly for the power utilities, the all-dielectric cable offers advantages which cannot otherwise be met. For instance, communications across optical fibers is not disturbed or influenced by the background electric fields in the vicinity of high voltage lines.

By way of history, the first solution to bringing fiber optic communications to the utilities was through Composite Optical Ground Wire (OPGW). However, these cables are costly and heavy, and therefore burden already loaded power lines. Also, since they are metallic, normal safety considerations make them difficult to install.

Thus, all-dielectric, self-supporting (ADSS) cables fill a needed requirement, particularly for the power utilities. They can be installed on power right-of-ways, and many times can be done so without powering the system down. The cables are typically much lighter than the OPGW cables and place less of a train on the support structures. They also present less of a safety hazard since they are non-conducting.

Current designs in ADSS cable include, generally speaking, concentric cables supported with aramid yarns surrounding the optical cable core, a slotted core glass reinforced plastic design, a pre-stranded design utilizing a fiber optical cable and an unattached aramid rope, a fiber optic cable attached by hangers to a fiber reinforced plastic (FRP) rod, an a Figure-8 cable with a polymer jacket coextruded over the optical fiber cable core and FRP messenger.

While all of these designs can be expected to be more cost effective in their application than the OPGW cable, optimizing the cost effectiveness for all of these other cable designs requires obtaining the maximum utility of the dielectric strength members such as aramid yarns or FRP rods. Typical fiber optic cable designs intended for buried applications allow for less than 0.5% cable strain. Compared with the strength of the dielectric materials, which typically can withstand strains of 2.5% or more, it is obvious that there is considerable waste of the expensive aramid yarn or FRP.

However, designing ADSS cables for higher strains required in aerial applications and the like requires consideration of a number of factors. The first is the necessity to minimize the strain on the optical fiber to prevent fatigue of the fiber. This can be accomplished in a loose tube cable design by adjusting the helical lay of the tube around a stranding element and by adjusting the excess fiber length in the tube. As the fiber bend radius is decreased, bending loss in the fiber, particularly at 1550 nm wavelength, is increased, placing practical limits on the cable strain window achievable prior to the onset of fiber strain.

Another factor of interest in designing high strain ADSS cables is the mechanical coupling of all cable components. As the primary strength element(s) are strained by the various ice and wind-loading conditions which an aerial cable will experience, relative motion between components must be controlled. In strain-uncoupled systems, such as a loosely pre-stranded cable or a hanger-type cable, control of the cable-to-messenger excess length can be used to minimize strain coupled from messenger to cable core to fiber. However, this type of system presents its own set of handling difficulties, such as proper reel payoff.

In a strain-coupled system such as the Figure-8 cable, where it is particularly important that relative motion between structural components not occur, the greatest concern is at the splice point. In an ADSS cable with a primary and secondary strength element (e.g., messenger and stranding element for a Figure-8 cable), imperfect coupling can cause the secondary strength element (or stranding element) which is normally secured within the splice closure to "piston" in and out of the cable core. At the least, fiber bending around the splices may occur, and at the worst the fibers may be broken which results in devastation of the system.

The object of this invention is to remove the onus of splice protection from the ancillary hardware manufacturer by providing a novel method for designing a high performance ADSS fiber optic cable with improved mechanical coupling to obviate "pistoning".

DISCLOSURE OF THE INVENTION

In accordance with the present invention, applicant provides a method of making an all-dielectric, self-supporting (ADSS) fiber optic aerial cable of the type comprising a core including at least one optical transmission fiber adjacent to a central strength member and surrounded by an outer jacket, and a radially spaced-apart strength member, the radially spaced-apart strength member serving as a primary strength element and the central strength member serving as a secondary strength element, wherein the "pistoning" movement of the secondary strength element within the cable core under cable strain is minimized so as to minimize fiber bending and breakage at the splice. The improved method of the invention comprises first calculating the required degree of mechanical coupling between the primary and secondary strength elements necessary to prevent "pistoning" by utilizing the following equation:

$$Kc = [EA]c * \frac{[T/[EA]m + (\alpha m - \alpha c)\Delta t}{XO}$$

wherein:
Kc = required degree of mechanical coupling between primary and secondary strength elements;
XO = minimum excess cable length between cable support structure and splice housing;
= maximum tension on system;
[EA]m = Young's Modulus − area product of primary element(s);
[EA]c = Young's Modulus − area product of secondary element(s);
$\alpha m$ = thermal coefficient of primary element;
$\alpha c$ = thermal coefficient of secondary element; and Δt=temperature change: operation-manufacture.

Next, suitable cable elements are selected in making the fiber optic cable, including an adhesive-type filling compound for the cable core, so as to make the fiber optic cable with a Kc value at least equal to the calculated Kc value and preferably greater. Finally, the fiber optic cable is formed from the selected elements and comprises a core including at least one optical transmission fiber adjacent to a central strength member and surrounded by an outer jacket, a radially spaced-apart strength member, and an adhesive type cable core filling compound.

It is therefore the object of the present invention to provide a method for making an all-dielectric, self-supporting fiber optic aerial cable wherein the mechanical bond between the primary and secondary strength elements is significantly increased.

Another object of this invention is to provide a method for making an all-dielectric, self-supporting aerial fiber optic cable wherein the secondary strength element within the cable core does not "piston" when the cable is subjected to a high strain.

Another object of the present invention is to provide a method of making an all-dielectric, self-supporting fiber optic aerial cable which can be subjected to high strain levels and which does not require a significant additional cable core length (XO) beyond the primary strength element support point to prevent the "pistoning" phenomenon.

Another object of the invention is to provide a system where the secondary strength of the optical cable core is sufficient to permit handling when separated from the primary strength messenger.

Still another object of the present invention is to provide a method for making an all-dielectric, self-supporting fiber optic aerial cable with improved mechanical coupling between the primary and secondary strength elements so as to prevent damage to the splice environment.

Some of the objects of the invention having been stated, other objects will become evident as the description proceeds, when taken in connection with the accompanying drawings.

BEST MODE FOR CARRYING OUT THE INVENTION

Figure 1:
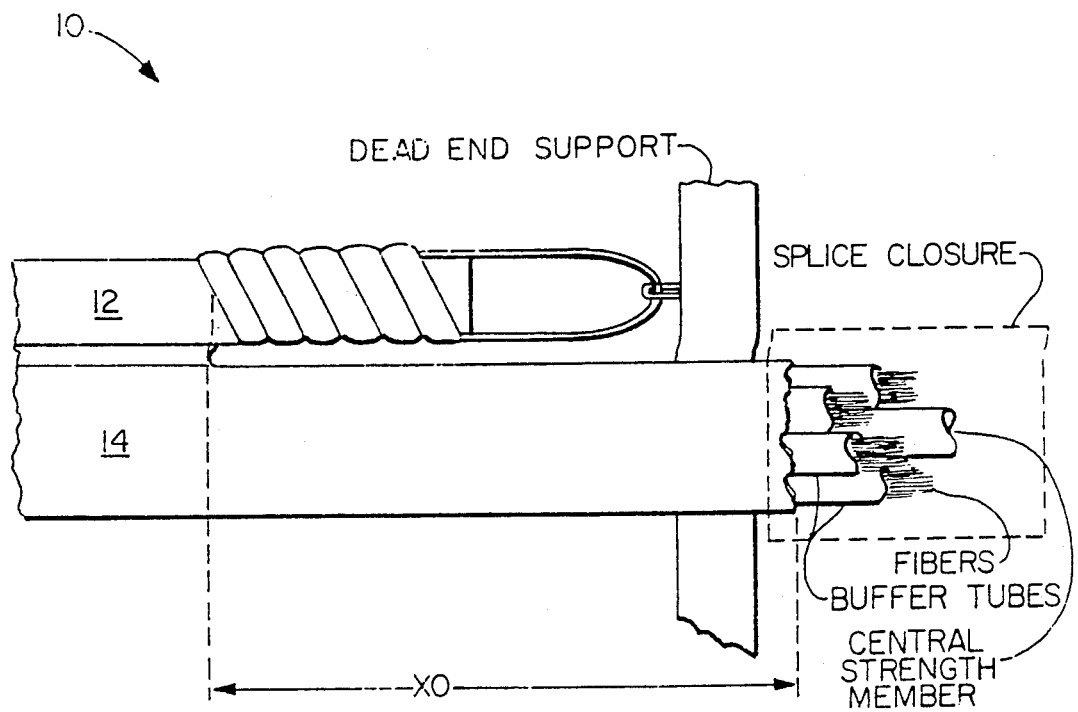
FIG. 1 is a side elevational view of a Figure-8 aerial cable with the messenger secured to an end support and the cable core connected to a splice closure.
Figure 2:
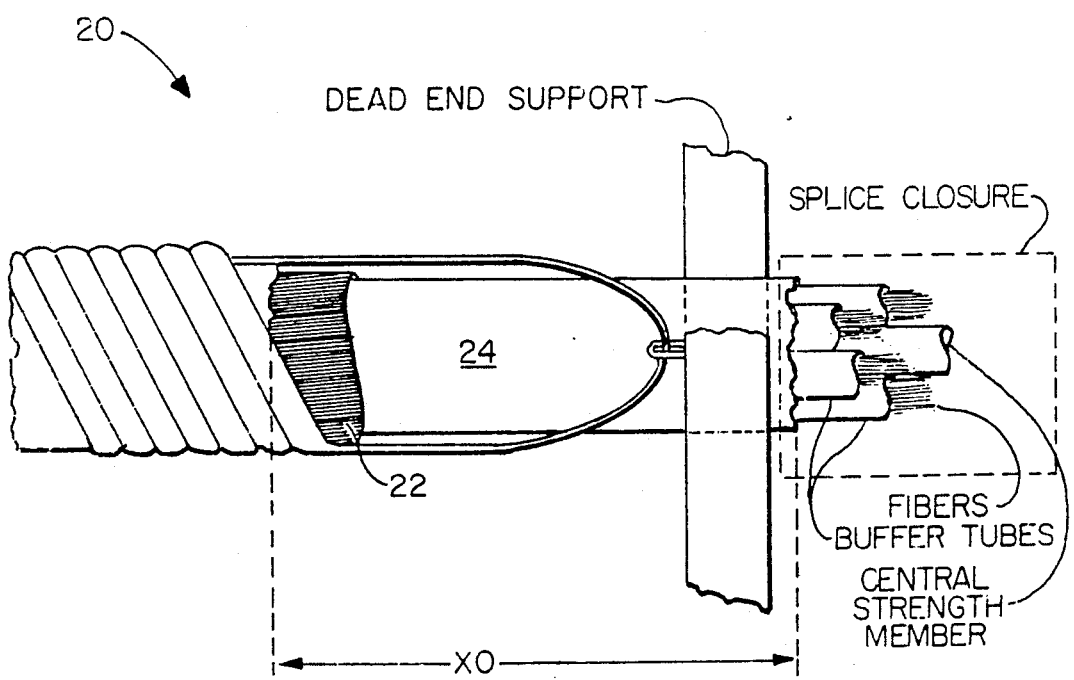
FIG. 2 is a side elevational view of a concentric cable with a helically wrapped primary support element secured to an end support and the cable core connected to a splice closure.
Figure 3:
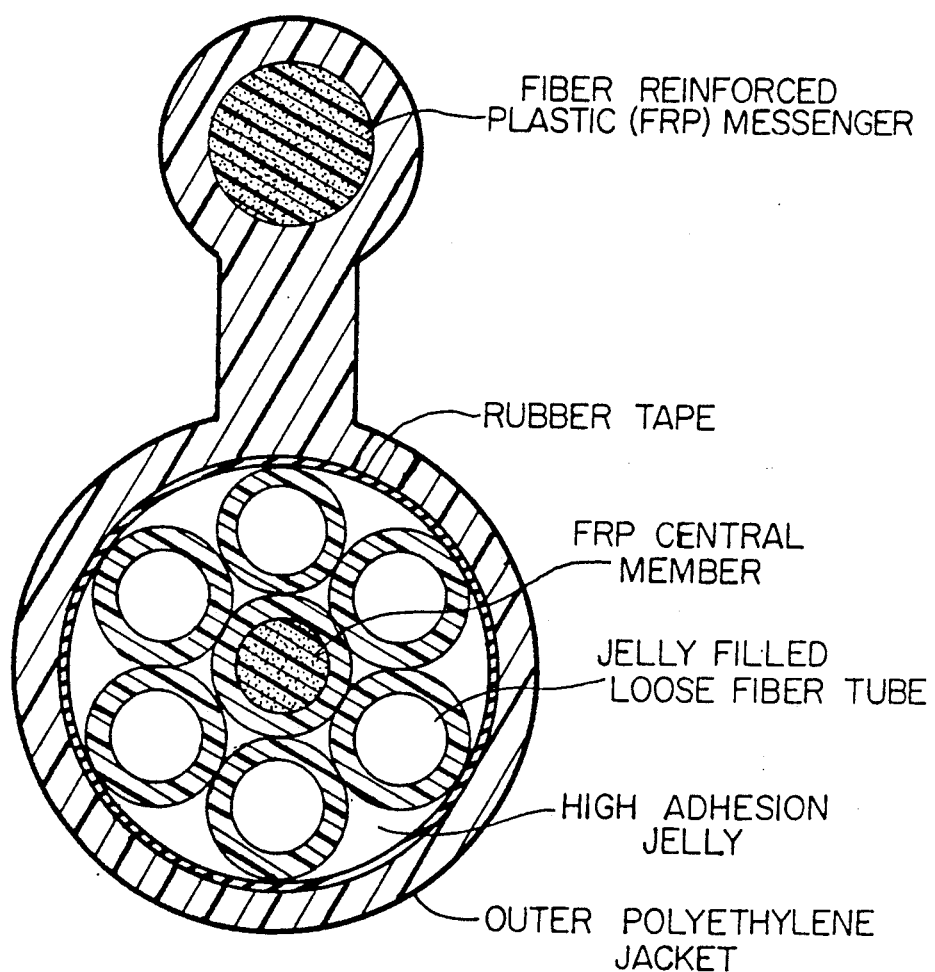
FIG. 3 is a transverse sectional view through a Figure-8 aerial cable made in accordance with the method of the present invention.

With reference to FIGS. 1–3 of the drawings, the invention is an improved method of making all-dielectric self-supporting (ADSS) fiber optic cables so as to (1) provide a secondary support element with sufficient strength to handle the fiber optic core when separated from the primary load-bearing support element, and (2) allow more efficient use of materials by creating higher operational cable strain levels without causing relative motion between strength and structural elements (which would degrade performance of the cable and damage fibers in the splice closure). These two objectives normally tend to be mutually exclusive, but the invention provides a method of cable design to meet the application objective of (1) while ensuring compliance to the performance objective of (2).

The design of an aerial fiber optic cable necessarily includes a primary strength element designed to bear the load of the cable throughout its operation. The selection of this primary element is made with regard to the environment within which the cable is expected to operate and with regard for the maximum strain to which the cable may be exposed without degrading fiber performance. This primary strength element in an aerial cable is most typically exterior to the core of the cable, either as a bonded addition to a cable core (such as messenger 12 supporting cable core 14 in Figure-8 cable 10 shown in FIG. 1) or circumferentially positioned around the cable core (such as aramid yarns 22 helically wrapped around cable core 24 in concentric cable 20 shown in FIG. 2).

These basic designs consist of buffered fibers (direct-coated or housed in buffer tubes) stranded around an interior stranding element or secondary strength element. In an underground cable application, this interior stranding element generally bears most, if not all of the entire load. Use of a standard strength stranding element in a normal core design (i.e., underground designs) presents the opportunity for "pistoning" to occur when the cable is used in a relatively high strain aerial application.

Thus, applicant has determined that to properly design the core of a self-supporting aerial cable, it is necessary to examine the mechanical relationships which cause or allow suppression of the "pistoning" phenomenon. Specifically, it is necessary to fully couple strain from the primary to the secondary strength elements. Three primary considerations in doing so are:

1. The tensile strengths and coefficients of thermal expansion of the primary and secondary strength elements ([EA]m, [EA]C, αm, αc);

2. The degree of mechanical coupling between the primary and secondary strength elements (Kc); and 3. The minimum cable length allowed between the support point and the splice point (XO).

The goal of equalizing total strain of the primary and secondary strength elements is accomplished by designing a cable considering the following formula:

$$Kc = [EA]c * \frac{[T/[EA]m + (\alpha m - \alpha c)\Delta t]}{XO}$$

wherein

Kc = required degree of mechanical coupling between primary and secondary strength elements;

XO = minimum excess cable length between cable support structure and splice housing;

T = maximum tension on system;

[EA]m = Young's Modulus−area product of primary element(s);

[EA]c = Young's Modulus−area product of secondary element(s);

αm = thermal coefficient of primary element;

αc = thermal coefficient of secondary element; and

Δt = temperature change: operation-manufacture.

The ratio T/[EA]m, which gives the cable strain and nominally defines the tensile operating parameters of the cable under load, governs the primary design consideration for the cable manufacturer. To fully utilize the strength of materials available, this value should be as large as possible.

As T/[EA]m increases, the balance of the equation is satisfied through proper choice of the secondary strength element, processing materials and conditions which enhance the coupling, and assumptions as to what the minimum excess cable length requirement (XO) must be. Presently many cable manufacturers attempt to overcome the "pistoning" phenomenon of the cable core secondary strength element with an excessively large XO length of greater than 15 feet. The minimum cable excess length XO, as well as the design specifications of a splice closure, should not have to be mandated by the cable manufacturer. Therefore, applicant has developed a method to design a cable which will operate with a minimum XO and yet overcome the "pistoning" problem which is so well known to those familiar with the ADSS cable art.

The choice of a secondary element is simplified by assuming that it is only a stranding component, and [EA]c is chosen as small as possible. However, whether in a Figure-8 design (FIG. 1) or concentric cable design (FIG. 2), the cable core will need to be handled when separated from the primary messenger by the installation crew in the splicing procedure. Therefore, it is necessary to design into the cable a reasonable handling strength of the core through selection of this secondary element. A minimum handling strength of 200 lbs., for example, would allow for core handling during cable installation.

This leaves determination of the coupling constant Kc. A coupling constant Kc=3 lb/ft is reasonable when the splice closure is designed to handle the force of "pistoning". This may be suitable for a low strain cable system (0.5%) where excess cable length is high, the splice closure is specified, and the secondary member is suitably weak. However, if a 1% strain cable system is considered, a cable excess length XO of no more than 15 feet is required, and no requirements are placed on the splice closure as a suppression measure, then the maximum strength of the secondary strength element which can be used is 40 lbs/% (neglecting temperature dependence). Applications considerations require that the cable core should nominally be able to support the weight of a 200 lb. man, and thus the 40 lbs/% is inadequate for the satisfactory design of ADSS cables.

The method of the invention provides an improved method for designing a cable with enhanced mechanical coupling of the primary and secondary strength elements to provide a high strain cable. The cable provides a number of advantages on installation including (1) allowing the fiber optic core section to be handled separately from the primary messenger; (2) placing reduced limitations on the amount of cable (XO) which must remain between the support structure and the splice closure; and (3) removing the burden of protecting fibers from "pistoning" with the splice closure design so as to allow use of standard products.

EXAMPLE 1

Specifically, for a typical ADSS Figure-8 cable (Catalog No. SE-3GJ0XX0, 6 position loose tube with FRP primary and secondary strength members) manufactured by Sumitomo Electric Fiber Optics Corporation in Research Triangle Park, North Carolina, the following values were used in first calculating a minimum Kc according to applicant's invention:

[EA]m = 1528 lbs/% :Design
[EA]c = 200 lbs/% :Design (minimum)
T = 1528 lbs. :Design
$\epsilon$cable 1% :Design
$\alpha m = \alpha c$ :Design
XO = 15 ft. :Application Requirement
Kc = 13 lbs/ft. :Requirement Next, with reference to FIG. 3, selection of an adhesive-type core filling compound with a rubber tape wrap in conjunction with a nominal-strength secondary strength element allowed the manufactured cable to meet the coupling performance requirements with a considerable safety margin as can be seen with reference to Tables 2 and 3 below:

TABLE 2

Coupling Constant Test

| Test Length | Coupling Force | |
|---|---|---|
| | Adhesive Jelly | Adhesive Jelly and Rubber Tape |
| ½ m | 0.2512 KN (Kilonewtons) | 0.2997 KN (Kilonewtons) |
| 1 m | 0.5775 KN | 0.6122 KN |
| 2 m | 0.9212 KN | 1.087 KN |
| Kc | 489.4 N/M (Newtons/Meter) (33.2 lb/ft) | 559.3 N/M (Newtons/Meter) (38.3 lb/ft) |

$Kc = \frac{\Sigma Y_i X_i}{\Sigma X_i^2}$
$Y_i$ = coupling force
$X_i$ = test length

TABLE 3

Pistoning Test

Center
Secondary Strength Element Movement (mm)

0-x--x--x--x--x--x--x--x--x--x

XO = 5

1.1

Total Cable Strain (%)

Applicant's tests have confirmed that no more than 5 feet of cable (XO) is required to fully suppress "pistoning" at the rated loads in the test cable in contrast to 15 feet or more in prior art cables.

As an additional design consideration, the temperature coefficients of the strength elements also play a role. To minimize this as a variable, it is best to select similar materials. In the Fibure-8 test cable, both materials are the same FRP type rod and have equal thermal coefficients ($\alpha m = \alpha c$). Alternatively, the primary strength element could comprise aramid yarn and the secondary strength element could comprise FRP or, preferably, aramid yarn. With regard to concentric cable constructions, the primary strength element could comprise aramid yarn and the secondary strength element could comprise FRP or, preferably, aramid yarn. It should be appreciated that these are representative materials for both cables and that others are possible.

Thus, while the above description primarily involves design of an FRP Figure-8 cable, the novel method is applicable also to cables with aramid or other yarns as the primary support structure, whether in the form of an aramid rope messenger Figure-8 cable or a concentrically designed cable.

It will thus be seen that there has been described above an improved method for making an all-dielectric, self-supporting fiber optic aerial cable which results in improved mechanical coupling between the primary and secondary strength elements so as to overcome the "pistoning" phenomenon which can result in damage to the optical fibers at the splice closure.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method of making an all-dielectric self-supporting fiber optic aerial cable of a type comprising a core including at least one optical transmission fiber adjacent to a central strength member and surrounded by an outer jacket, and a radially spaced-apart strength member, said radially spaced-apart strength member serving as a primary strength element and said central strength member serving as a secondary strength element for said cable, wherein a pistoning movement of said secondary strength element within said cable core when under cable strain is minimized, said method comprising the steps of:

calculating a required degree of mechanical coupling between said primary and secondary strength elements according to the equation:

$$Kc = [EA]c * \frac{[T/[EA]m + (am - ac)\Delta t}{XO}$$

wherein

Kc = required degree of mechanical coupling between primary and secondary strength elements;
XO = minimum excess cable length between support structure and a splice housing;
T = maximum tension on system;
[EA]m = Young's Modulus—area product of primary element(s);
[EA]c = Young's Modulus—area product of secondary element(s);
αm = thermal coefficient of primary element;
αc = thermal coefficient of secondary element; and
Δt = temperature change: operation-manufacture;

selecting suitable elements in making said fiber optic cable, including at least an adhesive-type filling compound for said cable core, so as to make said fiber optic cable with a Kc value equal to or greater than said calculated Kc value; and forming said fiber optic cable from said selected elements, said fiber optic cable comprising a core including at least one optical transmission fiber adjacent to a central strength member and surrounded by an outer jacket, a radially spaced-apart strength member, and an adhesive-type cable core filling compound.

2. A method according to claim 1 wherein a value for [EA]c is selected to provide a minimum cable handling strength of about 200 pounds.

3. A method according to claim 1 wherein αm = αc.

4. A method according to claim 1 wherein XO is about 15 feet or less.

5. A method according to claim 1 wherein a rubber tape wrap is provided around said adhesive-type filling compound in making said fiber optic cable.

6. A method according to claim 1 wherein said primary strength element is helically wrapped around said jacket surrounding said optical fiber and central strength member.

7. A method according to claim 6 wherein said primary strength element comprises aramid yarn.

8. A method according to claim 6 wherein said secondary strength element comprises fiber reinforced plastic (FRP).

9. A method according to claim 6 wherein said primary and secondary strength elements comprise aramid yarn.

10. A method according to claim 1 wherein said primary strength element comprises a supporting messenger attached to said jacket surrounding said optical fiber and central strength member.

11. A method according to claim 10 wherein said primary and secondary strength elements comprise fiber reinforced plastic (FRP).

12. A method according to claim 10 wherein said primary strength element comprises aramid yarn and said secondary strength element comprises FRP.

13. A method according to claim 10 wherein said primary and secondary strength elements comprise aramid yarn.

14. A method of making an all-dielectric, self-supporting fiber optic aerial cable of a Figure-8 type comprising a core including at least one optical transmission fiber adjacent to a central strength member and surrounded by an outer jacket, and a supporting messenger therefor, said messenger serving as a primary strength element and said central strength member serving as a secondary strength element for said cable, wherein a pistoning movement of said secondary strength element within said cable core under cable strain is minimized, said method comprising the steps of:

calculating a required degree of mechanical coupling between said primary and secondary strength elements according to the equation:

$$Kc = [EA]c * \frac{[T/[EA]m - (am - ac)\Delta t}{XO}$$

wherein:

Kc = required degree of mechanical coupling between primary and secondary strength elements;
XO = minimum excess cable length between cable support structure and a splice housing;
T = maximum tension on system;
[EA]m = Young's Modulus—area product of primary element(s);
[EA]c = Young's Modulus—area product of secondary element(s);
αm = thermal coefficient of primary element;
αc = thermal coefficient of secondary element; and
Δt = temperature change: operation-manufacture;

selecting suitable elements in making said fiber optic cable, including an adhesive-type filling compound for said cable core, so as to make said fiber optic cable with a Dc value equal to or greater than said calculated Kc value; and forming said fiber optic cable from said selected elements, said fiber optic cable comprising a core including at least one optical transmission fiber adjacent to a central strength member and surrounded by an outer jacket, a supporting messenger, and an adhesive-type cable core filling compound.

15. A method according to claim 14 wherein a value for [EA]c is selected to provide a minimum cable handling strength of about 200 pounds.

16. A method according to claim 14 wherein $\alpha m = \alpha c$.

17. A method according to claim 14 wherein XO is about 15 feet or less.

18. A method according to claim 14 wherein a rubber tape wrap is provided around said adhesive-type filling compound in making said fiber optic cable.

19. A method according to claim 14 wherein said primary and secondary strength elements comprise fiber reinforced plastic (FRP).

20. A method according to claim 14 wherein said primary strength element comprises aramid yarn and said secondary strength element comprises FRP.

* * * * *